Patented Apr. 7, 1953

2,634,295

UNITED STATES PATENT OFFICE 2,634,295

PROCESS FOR CATALYTIC DEHYDROGENATION OF ALCOHOLS TO CARBONYL COMPOUNDS

Alexander F. MacLean, Robstown, Tex., assignor to Celanese Corporation of America, New York, N. Y., a corporation of Delaware No Drawing. Application July 23, 1949, Serial No. 106,502

12 Claims. (Cl. 260—596)

This invention relates to the dehydrogenation of alcohols and relates more particularly to the catalytic vapor phase dehydrogenation of alcohols to form aldehydes and ketones.

An object of this invention is the provision of an improved catalyst adapted to be employed in fluidized form in the vapor phase catalytic dehydrogenation of alcohols to aldehydes and ketones.

Another object of this invention is to provide an improved process for the vapor phase catalytic dehydrogenation of alcohols to aldehydes or ketones wherein the dehydrogenation is effected as a continuous operation with the conversion and efficiency being maintained at a high level over extended periods of time.

Other objects of this invention will appear from the following detailed description.

The vapor phase catalytic dehydrogenation of alcohols is a reaction widely employed industrially for the production of many carbonyl compounds. For example, the dehydrogenation of isopropyl alcohol is being employed industrially for the production of acetone and of n-propyl alcohol for the production of propionaldehyde. Similarly, ethanol may be readily dehydrogenated to acetaldehyde which, on oxidation, is converted to acetic acid. The reaction is a reversible one and those catalysts which have a dehydrogenating effect also serve as hydrogenation catalysts under certain conditions. In addition, it has also been found that many catalysts which may be employed for dehydrogenation are not specific for said reaction only and also exhibit a tendency to act as dehydration catalysts, which gives rise to obviously undesirable side reactions. The dehydrogenation catalysts employed heretofore have been utilized in the form of a fixed bed. The use of a fixed catalyst bed, however, makes temperature control somewhat difficult and frequently leads to decomposition and dehydration. In addition a fixed bed catalyst cannot be regenerated concurrent with the dehydrogenation cycle but must be regenerated in a separate cycle as oxygen or oxygen in air mixed with the feed disappears rapidly at the inlet of the fixed bed and loses its effect over most of the bed.

I have now found that the catalytic vapor phase dehydrogenation of alcohols and ketones may be effected with a high degree of conversion and efficiency if the dehydrogenation is effected in the presence of a novel catalyst employed in fluidized form, said novel catalyst comprising finely-divided particles of inactive alumina having a mixture of barium oxide, chromium oxide and cupric oxide on the surfaces thereof. This novel catalyst, I have found, is highly resistant to attrition and physical disintegration into fines or particles below the minimum optimum size for fluidized catalytic operation and the original catalyst particles retain their initial high catalytic activity over prolonged periods of operation. Furthermore, should the activity of said catalyst fall below that degree which is essential for economic operation, the catalyst may be readily regenerated and restored to the original high state of activity by merely heating in air so as to burn off any carbon deposited thereon, which deposits are usually responsible for any observed decrease in activity. These carbon deposits are normally burned off at least in part concurrent with the dehydrogenation when oxygen or air is present in the vapors passing over the catalyst. Since the bed is in a turbulent state the partially carbonized catalyst in the entire bed is generally exposed to gas containing sufficient oxygen to burn off the carbon concurrent with the dehydrogenation cycle.

The novel catalyst of my invention may be prepared by adding inactive alumina to an aqueous solution formed by dissolving barium hydroxide in water, neutralizing the resulting solution with glacial acetic acid and adding copper nitrate and chromium nitrate thereto, the slurry which is obtained on addition of the inactive alumina being then evaporated to dryness. The coated particles thus obtained have no catalytic activity, however, without a suitable activation treatment. The particles may be activated by heating them in air at a temperature of 600 to 700° F. for about 1 to 4 hours. The heating or activation treatment in the presence of air converts the metal salts, deposited on the alumina particles by the evaporation of water from the slurry formed in the manner described above, into the corresponding oxides and in this form the catalyst particles exhibit the desired activity.

Thus, in forming my novel catalyst, from 5 to 15 parts by weight of barium hydroxide are dissolved in 100 parts by weight of hot distilled water maintained at a temperature of 80 to 100° F. and the solution obtained is then neutralized with glacial acetic acid. About 20 to 45 parts by weight of copper nitrate are then added to the neutralized solution together with 1 to 3 parts by weight of chromium nitrate. The latter is preferably added as a 30 to 50% by weight aqueous solution. Inactive alumina particles of 80 to 200 mesh size are then added in an amount of about 350 parts by weight and the resulting slurry thus formed is then dried with stirring. Stirring is employed so as to avoid the formation of large lumps. Drying may be effected conveniently in a steam-jacketed vessel, for example. The coated alumina particles thus obtained are then activated by being heated in air in fluidized form as described above. Activation is most advantageously effected by heating the coated catalyst particles at a temperature of about 600° F. for about 1 hour.

In carrying out the dehydrogenation reaction, the alcohol to be dehydrogenated is vaporized and each mol of alcohol mixed with 1 to 5 mols of water in the form of steam and with up to about 0.1 to 0.5 mol of oxygen, preferably in the form of air, and the resulting vapor mixture passed through the coated alumina catalyst particles at a velocity sufficient to maintain said particles in a fluidized form. The temperature of the catalyst should be maintained at from about 650 to 700° F. for optimum results with the reaction vapors being in contact with the catalyst for about 1.0 to 20 seconds. Superficial gas velocities of from 0.5 to 3.0 feet per second through the catalytic reactor are satisfactory to maintain proper fluidization. The superficial gas velocity is based on the volume of the reactants at the temperature and pressure at which the gases are maintained over the catalyst. A proper fluidization is attained when the catalyst particles, in motion, resemble a gently boiling liquid with a marked interface between the upper surface of the fluidized bed and the atmosphere above it. The static depth of the catalyst particles in the reactor is, preferably, from about 3 to 8 feet. The catalyst comprising the catalyst bed should be from 0.1 to 2.0 parts by weight for each part by weight per hour of alcohol passing through the catalytic reactor.

Part of the oxygen introduced with the alcohol vapors into the reaction zone in the form of air reacts exothermically with the hydrogen which is catalytically removed or split from the alcohol. Part also reacts with carbonaceous deposits to remove these deposits concurrent with the dehydrogenation thus maintaining the catalyst at a higher state of activity than would be possible in the absence of oxygen. Theoretically, for every mol of alcohol dehydrogenated, there will be one mol of hydrogen removed and this hydrogen requires one-half mol of oxygen, which reacts with the hydrogen to form water. I have found, however, that in the dehydrogenation of n-propanol and isopropanol for example, optimum results are obtained if from 10 to 60% of the theoretical oxygen, as air, is employed in the reaction mixture. The oxidation of the hydrogen formed as a product of the catalytic dehydrogenation is an exothermic reaction and aids in maintaining the necessary reaction temperature. In addition, the oxygen present minimizes the formation of carbon deposits since the latter are subject to oxidation and removal in the presence of free oxygen under the reaction temperatures prevailing. The amount of oxygen employed is dependent to some extent on the amount and nature of impurities in the feed which readily carbonize and form an inactivating deposit on the catalyst particles.

The presence of water vapor in the reaction mixture of alcohol and air is quite advantageous in that it inhibits side reactions, as for example, dehydration.

With regard to the pressure under which the dehydrogenation reaction may be effected, I have found that normal atmospheric pressure is preferred although the pressure employed may vary from normal atmospheric pressure up to about 15 to 30 pounds per square inch gauge. When operating under substantially atmospheric pressure, only sufficient pressure need be applied to the system to enable the vapor feed to flow through the system against the pressure exerted by the fluidized catalyst bed. The latter, in fluidized form, exerts a counter pressure and the pressure drop observed is equivalent to the counter pressure exerted by the bed acting as a heavy liquid.

In order further to illustrate my invention, but without being limited thereto, the following examples are given:

Example I

A catalyst suitable for the dehydrogenation of alcohols is prepared in the following manner:

3.0 parts by weight of barium hydroxide octahydrate are dissolved in about 23 parts by weight of distilled water at a temperature of 80° F. and the resulting solution neutralized, i. e. to a pH of 6, by the addition of glacial acetic acid thereto. 13 parts by weight of copper nitrate:$3H_2O$ are then added to the solution together with 0.5 part by weight of a 50% by weight aqueous solution of chromium nitrate:$9H_2O$. A slurry is then formed by the addition of 75 parts by weight of inactive alumina, of between 100 to 325 mesh particle size, to the aqueous solution with stirring. The paste thus formed is then dried in a steam jacketed kettle while being stirred to avoid lumping. The dried particles are then heated in a stream of air at 600° F. for 1 hour to convert the metal salts present thereon to the oxides, the coated alumina particles being thus activated for use in catalytic dehydrogenation reactions. The catalyst comprises finely-divided particles of inactive alumina having a mixture of 1.0 to 4.0% by weight of barium oxide, 0.05 to 1.0% by weight of chromium oxide and 2 to 6% by weight of cupric oxide on the surfaces thereof.

Example II 50 pounds per hour (0.83 pound mol) of isopropyl alcohol are vaporized, mixed with 28 pounds per hour of water (1.55 pound mols) in the form of steam and 423.6 cubic feet per hour of air at standard conditions (i.e. 60% of the oxygen, in the form of air, theoretically necessary to combine with the hydrogen splitting off under dehydrogenation conditions when both conversion and efficiency are 100%). The vapor mixture thus formed is continuously passed into a reactor containing 100 pounds of the activated catalyst particles prepared as described in Example I, the reactor being suitably heated so that the particles are maintained at a temperature of 675° F. The catalyst particles have a static depth of 3.5 feet. The velocity of the vapors passing through the catalyst is maintained sufficiently high to effect a fluidization of the catalyst particles, said velocity being about 1 foot per second. The depth of the catalyst bed is such that the vapors passing through the reactor which contains the catalyst particles are in contact with the fluidized catalyst particles for about 3.5 seconds. The mixture of gaseous reaction products formed is then passed through a tower where it is scrubbed with water so that the water-soluble components are absorbed. The fixed gases, comprising carbon monoxide, carbon dioxide, oxygen, nitrogen, and a small amount of unsaturated hydrocarbon which is formed, are vented. The aqueous solution of organic products is then separated by a suitable series of distillations into the several components present. The conversion of the isopropyl alcohol into useful products is found to be 43.5% per pass and the efficiency of conversion, that is, the proportion of feed consumed going to acetone, is about 90%. The activity of the catalyst remains substantially constant over more than 200 hours of continuous operation.

*Example III*

27 pounds of n-propyl alcohol per hour (0.45 pound mol) are vaporized, mixed with 6.7 pounds per hour of water (0.37 pound mol) in the form of steam and 104.1 cubic feet per hour of air at standard temperature and pressure (27% of oxygen, in the form of air, theoretically necessary to combine with the hydrogen splitting off under hydrogenation condition when both the conversion and efficiency are 100%) and the mixture passed through a reactor containing 90 pounds of the catalyst prepared in accordance with Example I and having a static depth of 3.0 feet. The catalyst is maintained at a temperature of 650° F. The vapors are passed through the reactor at a superficial velocity of about 1.0 foot per second so as to fluidize the catalyst particles. In passing through the reactor, the vapors remain in contact with the catalyst particles for about 3 to 4 seconds. The mixture of gaseous reaction products formed is passed through a scrubbing tower where it is scrubbed with water to remove the water-soluble components and the fixed gases are vented. The propionaldehyde and other organic compounds are separated by a suitable series of distillations. The conversion of n-propyl alcohol to useful products is found to be 39% per pass and the efficiency of conversion, i. e. to propionaldehyde, about 91%. The catalyst remains active over about 400 hours of continuous operation.

*Example IV*

The catalyst may be readily regenerated when the conversion and efficiency drop below an economic level. Regeneration is effected as follows:

The temperature of the fluidized catalyst bed is lowered to 550° F. and the flow of air to the system is cut off. The alcohol flow is then slowly reduced, the reduction in vapor volume in the system being replaced or made up by gradually increasing the flow of steam so that finally all of the vaporized alcohol feed is cut off and only steam is passing through the hot catalyst bed. The air flow is then gradually resumed as the steam flow is slowly cut out. The temperature of the catalyst bed is carefully controlled by adjusting the air flow so that the bed temperature does not rise materially above about 550° F. After the unit is on stream with only air flowing through the reactor the catalyst bed temperature is raised to 650° F. and these conditions are maintained until the carbon deposits on the catalyst particles are burned off which is indicated when the vent gases contain only a negligible proportion of carbon oxides.

To resume the catalytic dehydrogenation reaction after regeneration of the catalyst, the steam flow is resumed as the air is gradually cut off. When only steam is flowing through the system, the alcohol feed is then resumed until the ratio of entering alcohol and steam vapors is in the desired proportion. The air flow is then cut in which places the unit fully on stream for the catalytic dehydrogenation.

It is to be understood that the foregoing detailed description is given merely by way of illustration and that many variations may be made therein without departing from the spirit of my invention.

Having described my invention, what I desire to secure by Letters Patent is:

1. Process for the dehydrogenation of alcohols to carbonyl compounds, which comprises bringing vapors of the alcohol to be dehydrogenated into contact with a dehydrogenation catalyst comprising finely-divided particles of inactive alumina having a particle size of 80 to 325 mesh and having a mixture of barium oxide, chromium oxide and cupric oxide on the surfaces thereof while maintaining the catalyst particles in a fluidized state.

2. Process for the dehydrogenation of alcohols to carbonyl compounds, which comprises bringing a mixture of vapors of the alcohol to be dehydrogenated and oxygen into contact with a dehydrogenation catalyst comprising finely-divided particles of inactive alumina having a particle size of 80 to 325 mesh and having a mixture of barium oxide, chromium oxide and cupric oxide on the surfaces thereof while maintaining the catalyst particles in a fluidized state.

3. Process for the dehydrogenation of alcohols to carbonyl compounds, which comprises bringing a mixture of vapors of the alcohol to be dehydrogenated, steam and oxygen into contact with a dehydrogenation catalyst comprising finely-divided particles of inactive alumina having a particle size of 80 to 325 mesh and having a mixture of barium oxide, chromium oxide and cupric oxide on the surfaces thereof while maintaining the catalyst particles in a fluidized state.

4. Process for the dehydrogenation of alcohols to carbonyl compounds, which comprises bringing a mixture of vapors of the alcohol to be dehydrogenated and air into contact with a dehydrogenation catalyst comprising finely-divided particles of inactive alumina having a particle size of 80 to 325 mesh and having a mixture of barium oxide, chromium oxide and cupric oxide on the surfaces thereof while maintaining the catalyst particles in a fluidized state.

5. Process for the dehydrogenation of alcohols to carbonyl compounds, which comprises bringing a mixture of vapors of the alcohol to be dehydrogenated, steam and air into contact with a dehydrogenation catalyst comprising finely-divided particles of inactive alumina having a particle size of 80 to 325 mesh and having a mixture of barium oxide, chromium oxide and cupric oxide on the surfaces thereof while maintaining the catalyst particles in a fluidized state.

6. Process for the dehydrogenation of isopropyl alcohol to acetone, which comprises bringing vapors of isopropyl alcohol into contact with a dehydrogenation catalyst comprising finely-divided particles of inactive alumina having a particle size of 80 to 325 mesh and having a mixture of barium oxide, chromium oxide and cupric oxide on the surfaces thereof while maintaining the catalyst particles in a fluidized state.

7. Process for the dehydrogenation of isopropyl alcohol to acetone, which comprises bringing a mixture of vapors of isopropyl alcohol and oxygen into contact with a dehydrogenation catalyst comprising finely-divided particles of inactive alumina having a particle size of 80 to 325 mesh and having a mixture of barium oxide, chromium oxide and cupric oxide on the surfaces thereof while maintaining the catalyst particles in a fluidized state.

8. Process for the dehydrogenation of a propyl alcohol to carbonyl compounds, which comprises bringing a mixture of vapors of a propyl alcohol, steam and oxygen into contact with a dehydrogenation catalyst comprising finely-divided particles of inactive alumina having a particle size of 80 to 325 mesh and having a mixture of 1.0 to 4.0% by weight of barium oxide, 0.05 to 1.0% by weight of chromium oxide and 2 to 6% by weight of cupric oxide on the surfaces thereof while maintaining the catalyst particles in a fluidized state.

9. Process for the dehydrogenation of isopropyl alcohol to acetone, which comprises bringing a mixture of vapors of isopropyl alcohol and air into contact with a dehydrogenation catalyst comprising finely-divided particles of inactive alumina having a particle size of 80 to 325 mesh and having a mixture of barium oxide, chromium oxide and cupric oxide on the surfaces thereof while maintaining the catalyst particles in a fluidized state.

10. Process for the dehydrogenation of isopropyl alcohol to acetone, which comprises bringing a mixture of vapors of isopropyl alcohol, steam and air into contact with a dehydrogenation catalyst comprising finely-divided particles of inactive alumina having a particle size of 80 to 325 mesh and having a mixture of barium oxide, chromium oxide and cupric oxide on the surfaces thereof while maintaining the catalyst particles in a fluidized state.

11. Process for the dehydrogenation of isopropyl alcohol to acetone, which comprises vaporizing about 50 to 80 parts by weight per hour of isopropyl alcohol and mixing the vapors with about 1 to 5 moles of steam and 0.1 to 0.5 mole of oxygen in the form of air, per mol of alcohol, and bringing the vapor mixture into contact for a period of about 1 to 20 seconds with a dehydrogenation catalyst comprising finely-divided particles of inactive alumina having a particle size of 80 to 325 mesh and having a mixture of 1.0 to 4.0% by weight of barium oxide, 0.05 to 1.0% by weight of chromium oxide and 2 to 6% by weight of cupric oxide on the surfaces thereof while maintaining the catalyst particles in a fluidized state and at a temperature of 650 to 700° F.

12. Process for the dehydrogenation of n-propyl alcohol to propionaldehyde, which comprises vaporizing about 50 to 80 parts by weight per hour of n-propyl alcohol and mixing the vapors with about 1 to 5 moles of steam and 0.1 to 0.5 mole of oxygen in the form of air, per mol of alcohol, and bringing the vapor mixture into contact for a period of about 1 to 20 seconds with a dehydrogenation catalyst comprising finely-divided particles of inactive alumina having a particle size of 80 to 325 mesh and having a mixture of 1.0 to 4.0% by weight of barium oxide, 0.05 to 1.0% by weight of chromium oxide and 2 to 6% by weight of cupric oxide on the surfaces thereof while maintaining the catalyst particles in a fluidized state and at a temperature of 650 to 700° F.

ALEXANDER F. MacLEAN.

REFERENCES CITED

The following references are of record in the file of this patent:

UNITED STATES PATENTS

| Number | Name | Date |
|---|---|---|
| 1,663,350 | Roka | Mar. 20, 1928 |
| 1,895,516 | Lazier | Jan. 31, 1933 |
| 1,978,404 | Bloomfield et al. | Oct. 30, 1934 |
| 2,218,457 | Winans | Oct. 15, 1940 |
| 2,321,006 | Burk et al. | June 8, 1943 |
| 2,339,346 | McNamee et al. | Jan. 18, 1944 |
| 2,401,246 | Hull | May 28, 1946 |
| 2,419,342 | Edson et al. | Apr. 22, 1947 |
| 2,477,042 | Burnside | July 26, 1949 |
| 2,516,958 | Coley | Aug. 1, 1950 |